(12) United States Patent
Rosthauser

(10) Patent No.: US 6,287,495 B1
(45) Date of Patent: Sep. 11, 2001

(54) THIXOTROPIC WOOD BINDER COMPOSITIONS

(75) Inventor: James W. Rosthauser, Pittsburgh, PA (US)

(73) Assignee: Bayer Corporation, Pittsburgh, PA (US)

(*) Notice: Subject to any disclaimer, the term of this patent is extended or adjusted under 35 U.S.C. 154(b) by 0 days.

(21) Appl. No.: 09/221,034

(22) Filed: Dec. 23, 1998

(51) Int. Cl.$^7$ .................... B27N 3/02; C08J 5/06
(52) U.S. Cl. .............. 264/109; 523/205; 523/206; 523/209; 524/13
(58) Field of Search ................ 264/109, 122, 264/126, 128, 330; 523/209, 205, 206; 524/493, 589, 590, 13; 528/48, 55

(56) References Cited

U.S. PATENT DOCUMENTS

| | | | |
|---|---|---|---|
| 3,666,593 | 5/1972 | Lee | 156/285 |
| 3,870,665 | 3/1975 | Diehr et al. | 260/17.2 |
| 4,100,328 | 7/1978 | Gallagher | 428/407 |
| 4,393,019 | 7/1983 | Geimer | 264/83 |
| 4,517,147 | 5/1985 | Taylor et al. | 264/83 |
| 4,546,039 | 10/1985 | Horacek et al. | 428/357 |
| 4,609,513 | 9/1986 | Israel | 264/122 |
| 4,617,223 | 10/1986 | Hiscock et al. | 428/211 |
| 4,684,489 | 8/1987 | Walter | 264/101 |
| 4,692,479 * | 9/1987 | Schneider et al. | 523/209 |
| 4,719,278 | 1/1988 | Wellner et al. | 528/64 |
| 4,850,849 | 7/1989 | Hsu | 425/407 |
| 5,128,407 | 7/1992 | Layton et al. | 524/839 |
| 5,140,086 | 8/1992 | Hunter et al. | 527/103 |
| 5,143,768 | 9/1992 | Wilderman et al. | 428/68 |
| 5,179,143 | 1/1993 | König et al. | 524/35 |
| 5,332,458 | 7/1994 | Wallick | 156/210 |
| 5,459,185 | 10/1995 | Nakata et al. | 524/227 |
| 5,668,222 | 9/1997 | McKinley et al. | 525/415 |
| 5,744,079 | 4/1998 | Kimura et al. | 264/109 |

FOREIGN PATENT DOCUMENTS

| | | |
|---|---|---|
| 2043331 | 12/1991 | (CA). |
| 435428 | 7/1991 | (EP). |
| 1387454 | 3/1975 | (GB). |
| 3-21321 | 1/1991 | (JP). |
| 97/17388 | 5/1997 | (WO). |
| 97/42246 | 11/1997 | (WO). |

OTHER PUBLICATIONS

Database WPI, Section Ch, Week 199246, Derwent Publications Ltd., London, GB; Class A25, AN 1992–376359, XP002132309 & JP 04 275385 A (Toaka Chem Co Ltd), Sep. 30, 1992 abstract.

Database WPI, Section Ch, Week 197710, Derwent Publications Ltd., London, GB; Class A25 AN 1977–17022Y, XP002132310 & JP 52 009037 A (Daiichi Kogyo KK), Jan. 24, 1977 abstract.

James B. Wilson's paper entitled, "Isocyanate Adhesives as Binders for Composition Board" which was presented at the symposium "Wood Adhesives–Research, Application and Needs" held in Madison, Wisconsin on Sep. 23–25, 1980.

* cited by examiner

*Primary Examiner*—Mary Lynn Theisen
(74) *Attorney, Agent, or Firm*—Joseph C. Gil; N. Denise Brown

(57) ABSTRACT

This invention relates to a process for the production of composite wood products. This process comprises a) applying a thixotropic binder composition to wood particles, and b) molding or compressing the wood particles treated with the binder to form a composite wood product. Suitable thixotropic binder compositions comprise a polymethylene poly(phenyl isocyanate) and a thixotropic agent having a viscosity of less than 1,000 cps at high shear.

21 Claims, No Drawings

THIXOTROPIC WOOD BINDER COMPOSITIONS

BACKGROUND OF THE INVENTION

This invention relates to a process for producing wood composite material by combining wood particles with a thixotropic binder composition. Suitable thixotropic binder compositions comprising: 1)(a) a polyisocyanate, preferably a polymethylene poly(phenylisocyanate) or 1)(b) a semi-prepolymer of a polyisocyanate, preferably a semi-prepolymer of polymethylene poly(phenylisocyanate); and 2) a thixotropic agent which is selected from the group consisting of: (a) a mineral species, (b) a rheological species, (c) an adduct of (i) a polyisocyanate or a semi-prepolymer thereof, with (ii) a substituted aromatic amine and/or (iii) a fatty amine, and (d) mixtures thereof.

Composite materials such as oriented stand board, particle board and flake board are generally produced by blending or spraying comminuted lignocellulose materials such as wood flakes, wood fibers, wood particles, wood wafers, strips or strands, pieces of wood or other comminuted lignocellulose materials with a binder composition while the comminuted materials are blended by tumbling or agitating them in a blender or like apparatus. After blending sufficiently to form a uniform mixture, the materials are formed into a loose mat, which is compressed between heated platens or plates to set the binder and bond the flakes, strands, strips, pieces, etc., together in densified form. Conventional processes are generally carried out at temperatures of from about 120 to 225° C. in the presence of varying amounts of steam, generated by libration of entrained moisture from the wood or lignocellulose materials. These processes also generally require that the moisture content of the lignocellulose material be between about 2 and about 20% by weight, before it is blended with the binder.

Plywood production is accomplished by roll coating, knife coating, curtain coating, or spraying a binder composition onto veneer surfaces. A plurality of veneers are then laid-up to form sheets of required thickness. The mats or sheets are then placed in a heated press and compressed to effect consolidation and curing of the materials into a board.

Binder compositions which have been used in making such composite wood products include phenol formaldehyde resins, urea formaldehyde resins and isocyanates. See, for example, James B. Wilson's paper entitled, "Isocyanate Adhesives as Binders for Composition Board" which was presented at the symposium "Wood Adhesives—Research, Applications and Needs" held in Madison, Wis. on Sep. 23–25, 1980, in which the advantages and disadvantages of each of these different types of binders are discussed.

Isocyanate binders are commercially desirable because they have low water absorption, high adhesive and cohesive strength, flexibility in formulation, versatility with respect to cure temperature and rate, excellent structural properties, the ability to bond with lignocellulosic materials having high water contents, and no formaldehyde emissions. The disadvantages of isocyanates are difficulty in processing due to their high reactivity, adhesion to platens, lack of cold tack, high cost and the need for special storage. U.S. Pat. No. 3,870,665 and German Offenlegungsschrift No. 2,109,686 disclose the use of polyisocyanates (and catalysts therefor) in the manufacture of plywood, fiberboard, compression molded articles, as well as various technical advantages when used as binders.

It is known to treat cellulosic materials with polymethylene poly(phenyl isocyanates) (hereinafter "polymeric MDI") to improve the strength of the product. Typically, such treatment involves applying the isocyanate to the material and allowing the isocyanate to cure, either by application of heat and pressure (see, e.g., U.S. Pat. Nos. 3,666,593, 5,008,359, 5,140,086, 5,143,768, and 5,204,176) or at room temperature (see, e.g., U.S. Pat. Nos. 4,617,223 and 5,332,458). While it is possible to allow the polymeric MDI to cure under ambient conditions, residual isocyanate groups remain on the treated products for weeks or even months in some instances. It is also known to utilize toluylene diisocyanate for such purposes.

Isocyanate prepolymers are among the preferred isocyanate materials which have been used in binder compositions to solve various processing problems, particularly adhesion to press platens and high reactivity. U.S. Pat. No. 4,100,328, for example, discloses isocyanate-terminated prepolymers which improve product release from a mold. U.S. Pat. No. 4,609,513 also discloses a process in which an isocyanate-terminated prepolymer binder is used to improve product release. A binder composition in which a particular type of isocyanate prepolymer is used to improve adhesiveness at room temperature is disclosed in U.S. Pat. No. 5,179,143.

A major processing difficulty encountered with isocyanate binders is the rapid reaction of the isocyanate with water present in the lignocellulosic material and any water present in the binder composition itself. One method for minimizing this difficulty is to use only lignocellulosic materials having a low moisture content (i.e., a moisture content of from about 3 to about 8%). This low moisture content is generally achieved by drying the cellulosic raw material to reduce the moisture content. Such drying is, however, expensive and has a significant effect upon the economics of the process. Use of materials having low moisture contents is also disadvantageous because panels made from the dried composite material tend to absorb moisture and swell when used in humid environments.

Another approach to resolving the moisture and isocyanate reactivity problem is disclosed in U.S. Pat. No. 4,546,039. In this disclosed process, lignocellulose-containing raw materials having a moisture content of up to 20% are coated with a prepolymer based on a diphenylmethane diisocyanate (MDI) mixture. This prepolymer has a free isocyanate group content of about 15 to about 33.6% by weight and a viscosity of from 120 to 1000 mPa·s at 25° C. This prepolymer is prepared by reacting (1) about 0.05 to about 0.5 hydroxyl equivalents of a polyol having a functionality of from 2 to 8 and a molecular weight of from about 62 to about 2000 with (2) one equivalent of a polyisocyanate mixture containing (a) from 0 to about 50% by weight of polyphenyl polymethylene polyisocyanate and (b) about 50 to about 100% by weight isomer mixture of diphenylmethane diisocyanate containing 10 to 75% by weight of 2,4'-isomer and 25 to 90% by weight of 4,4'-isomer.

U.S. Pat. No. 5,002,713 discloses a method for compression molding articles from lignocellulosic materials having moisture contents of at least 15%, generally from 15 to 40%. In this disclosed method, a catalyst is applied to the lignocellulosic material. A water resistant binder is then applied to the lignocellulose with catalyst and the coated materials are then compression shaped at a temperature of less than 400° F. to form the desired composite article. The catalyst is a tertiary amine, an organometallic catalyst or a mixture thereof. The binder may be a hydrophobic isocyanate such as any of the polymeric diphenylmethane diisocyanates, m- and p-phenylene diisocyanates, chlorophenylene diisocyanates, toluene diisocyanates, toluene triisocyanates, triphenyl-methane triisocyanates, diphenylether-2,4,4'-triisocyanate and polyphenol polyisocyanates. The catalyst is included to ensure that the isocyanate!/water reaction is not slowed to such an extent that the pressing time necessary to produce the molded product is significantly increased.

Pressing of wafer board, oriented strand board, and parallel strand lumber using steam injection and a conventional binder such as a urea-formaldehyde resin or a polymeric diphenylmethane diisocyanate (PMDI) is known. Examples of such known pressing processes are disclosed in U.S. Pat. Nos. 4,684,489; 4,393,019; 4,850,849; and 4,517,147. These processes yield a product having satisfactory physical properties if the binder is completely cured.

The completeness of binder cure may, of course, be determined by destructive testing of samples which have been permitted to cure for varying amounts of time under the process conditions. The cure time to be used during the production process is determined on the basis of the sample which had completely cured in the least amount of time. The disadvantages of this method are readily apparent. Valuable product is destroyed in the testing. Further, any variation in wood composition, extent of binder dispersion on the wood particles, etc. or processing conditions which would affect the rate of binder cure are not taken into consideration in the above-described method.

Binding compositions comprising urea extended polyisocyanates derived from a combination of a polyisocyanate and urea which is in solution with water, and the process for preparing the binding compositions is disclosed in U.S. Pat. No. 5,128,407. This reference also describes a process for preparing a composite material from comminuted particles or veneers of a lignocellulose material comprising coating the particles or veneers with these binding compositions.

A process for producing compression molded articles of lignocellulose type materials by use of an organic polyisocyanate compound as a binder is disclosed by U.S. Pat. No. 5,744,079. The binders comprise (A) an organic polyisocyanate such as, for example, MDI or PMDI, (B) an aqueous emulsion of a wax having a melting point ranging from 50° C. to 160° C., (C) an organic phosphate ester derivative, and (D) optionally, water.

The large scale industrial manufacture of composite materials which are bonded exclusively with polyisocyanates have previously been limited. The use of some of the polyisocyanates, particularly the better performing isocyanates, such as polymeric MDI, has been limited by their cost. Because of the cost constraints, the level of use of these expensive isocyanates is kept low for a given material. One approach to the use of levels of these isocyanates has involved chain extending the isocyanate with inexpensive extenders.

It has been known that organic polyisocyanate resins have excellent adhesion properties and workability as the adhesive for thermo-compression molded articles such as particle boards and medium-quality fiber boards produced from a lignocellulose type material such as wood chips, wood fibers, and the articles exhibit excellent physical properties. However, the excellent adhesiveness of the organic polyisocyanate resins causes disadvantage in that the compression molded article adheres firmly to the contacting metal surface of the heating plate in a continuous or batch thermo-compression process.

To solve the disadvantages of the undesired adhesion to the heating plate, it is required that a releasing agent is preliminarily sprayed onto the heating plate surface to form a releasing layer. Japanese Patent Publication No. 3-21321 discloses a method different from the external releasing agent spray, in which a mixture of an organic polyisocyanate and a mineral wax is sprayed onto the lignocellulose type material prior to thermo-compression molding. Japanese Patent laid open application No. 4-232004 discloses a method of thermo-compression molding of a lignocellulose type material by addition of a neutral ortho-phosphate ester as a compatibilizing agent, the wax and the polyisocyanate.

Another property that low viscosity organic polyisocyanate resins have is their tendency to quickly penetrate into the surface of the wood particles. Penetrated resin is not as effective as resins that sit on the surface of the wood particles towards promoting adhesion of the particles to each other. Higher viscosity resins penetrate less quickly than low viscosity ones. A simple and common method used in the coatings and adhesives industries to control viscosity is to add a thixotrope to the resin compositions.

A process for the preparation of air-drying, thixotropic binders containing free isocyanate groups is described in U.S. Pat. No. 4,719,278. These are prepared by reacting selected prepolymers or semi-prepolymers containing free isocyanate groups with selected aromatic diamines. Suitable prepolymers or semi-prepolymers are those containing free isocyanate groups and having an isocyanate content of about 0.5 to 20% by weight. Suitable aromatic diamines are those compounds which have at least one alkyl substituent in the ortho position to each amino group. The $NCO:NH_2$ equivalent ratio is about 0.5:1 to 50:1 based on the isocyanate groups of the isocyanate component and the amino groups of the aromatic diamine, provided that the equivalent ratio of isocyanate groups to amino groups is at least 10:1.

U.S. Pat. No. 4,692,479 describes the use of thixotropic additives to polymeric MDI for the purpose of improving mixing of the low viscosity polyisocyanate with much higher viscosity phenolic resins. These compositions have very high viscosities of about 30,000 to 40,000 cps and are subsequently used as binders for foundry cores but are too viscous for use as wood binders.

U.S. Pat. Nos. 5,459,185 and 5,668,222 both describe the usefulness of thixotropes in moisture curing polyurethane adhesives. Here, the principle is to use gelling agents or incompatible mixtures to provide thixotropic properties to the polyurethane compositions. Again, very high viscosities of greater than 30,000 cps are required for the adhesives.

It is the purpose of this invention to utilize small amounts of thixotropes to reduce penetration of the PMDI resin into the wood particles prior to forming wood composites. The viscosity must remain low enough so that the resin can be spray applied. Also, the addition of these materials must not detract from the structural properties of the formed composites. Reducing the amount of penetration of resin into the wood particles reduces the amount of water that comes into contact with the reactive isocyanate groups prior to pressing. Thus, the workable open time of the resin coated particles can be increased even in the presence of higher moisture content in the wood particles.

SUMMARY OF THE INVENTION

This invention relates to a process for the production of wood composite materials comprising A) combining wood particles with a thixotropic binder composition, and B) molding or compressing the combination of wood particles and thixotropic binder composition formed in A). Suitable thixotropic binder compositions to be combined with the wood particles in step A) comprise:

1) a polyisocyanate component selected from the group consisting of:

(a) a polymethylene poly(phenylisocyanate) component having an NCO group content of about 30 to 33%, preferably a polymethylene poly(phenylisocyanate) having a viscosity of less than about 2,000 cps at 20° C., and most preferably a polymethylene poly (phenylisocyanate) having a functionality of about 2.1 to about 3.5, an NCO group content of from about 30% to about 33%, and a monomer content of from about 30% to about 90% by weight, wherein the content of the monomer comprises from up to about 5% by weight of the 2,2'-isomer, from about 1% to about 20% by weight of the 2,4'-isomer, and from about 25% to about 65% by weight of the 4,4'-isomer, based on the entire weight of the polyisocyanate; and (b) a semi-prepolymer of a polymethylene poly (phenylisocyanate) having an NCO group content of about 25 to 33%, preferably a semi-prepolymer of a polymethylene poly(phenylisocyanate) having a urethane group content of about 0.5 to 6% and a viscosity of less than about 2,000 cps at 20° C., and being prepared by reacting a polymethylene poly (phenylisocyanate) with polyols or by blending a polymethylene poly(phenylisocyanate) with prepolymers from monomeric methylene bis(phenyl-isocyanate); and 2) a thixotropic agent selected from the group consisting of:
(a) a mineral species,
(b) a rheological additive,
(c) an adduct containing terminal NCO groups and urea groups, which comprises the reaction product of
   (1) a polyisocyanate or a semi-prepolymer of a polyisocyanate, and
   (2) a compound selected from the group consisting of
      (i) a substituted aromatic diamine, (ii) a fatty amine, and (iii) a polyamine based on a fatty acid; and
(d) mixtures thereof.

Suitable thixotropic agents for the present invention are added to the polyisocyanate component 1) above in an amount such that the viscosity of the resultant thixotropic binder composition is less than 1,000 cps (preferably 250 to 750 cps, most preferably 250 to 500 cps) at high shear (i.e., $\geq 50$ rpm), in a weight ratio of component 2) to component 1) of from 0.001:1 to 0.1:1, preferably from 0.002:1 to 0.05:1, and most preferably from 0.005:1 to 0.02: 1.

In accordance with the present invention, wood particles are combined with from 1 to 25%, preferably 2 to 10%, most preferably 3 to 8% by weight, based on the total weight of the wood composite, of the thixotropic binder compositions as described above.

In a preferred embodiment of the present invention, the thixotropic binder composition additionally comprises:
3) up to 20% by weight, based on the total weight of the thixotropic binder composition, of a high boiling solvent.

DETAILED DESCRIPTION OF THE INVENTION

As used herein, the term high shear with respect to the thixtropic agent means that the viscosity was determined at least 50 rpm, preferably from at least 50 to 100 rpm, at a temperature of 25° C.

Polymeric MDI as used herein, refers to the three-ring and/or higher ring products derived by the phosgenation of aniline-formaldehyde condensation products.

Suitable polyisocyanates to be used as component 1) of the compositions in the present invention include (a) those polymethylene poly(phenylisocyanate) blends having a NCO group content of about 30% to 33% by weight, and preferably having a viscosity of less than about 2,000 cps at 20° C.; and (b) semi-prepolymers of polymethylene poly (phenylisocyanate) having an NCO group content of about 25 to 33%. These semi-prepolymers have a urethane group content of about 0.5 to 6% and a viscosity of less than about 2,000 cps at 20° C. It is preferred that the polymethylene poly(phenylisocyanate) blends and semi-prepolymers of the present invention have a viscosity of from about 20 to about 400 cps at 20° C., and most preferably of from about 40 to about 250 cps at 20° C.

The polyisocyanates of the present invention have a functionality of from about 2.1 to about 3.5, preferably 2.3 to 3.0 and most preferably of 2.6 to 2.8, and an NCO group content of about 30% to about 33%, preferably about 30.5% to about 32.5%, and a monomer content of from about 30% to about 90% by weight, preferably from about 40% to about 70%, wherein the content of monomer comprises up to about 5% by weight of the 2,2'-isomer, from about 1 to about 20% by weight of the 2,4'-isomer, and from about 25 to about 65% by weight of the 4,4'-isomer, based on the entire weight of the polyisocyanate. The polymeric MDI content of these isocyanates varies from about 10 to about 70% by weight, preferably from about 30% to about 60% by weight, based on the entire weight of the polyisocyanate.

A preferred polymethylene poly(phenylisocyanate) blend has a functionality of from 2.2 to 2.4, an NCO group content of from about 31.2 to about 32.8% by weight, and a monomer content of from about 55% to about 80%, wherein the content of monomer comprises no more than about 3% by weight of the 2,2'-isomer, from about 15% to about 20% by weight of the 2,4'-isomer and from about 40% to about 55% by weight of the 4,4'-isomer, based on the entire weight of the polyisocyanate. This polyisocyanate blend comprises from about 20 to about 45% by weight, based on the entire weight of the polyisocyanate, of polymeric MDI.

Most preferred polyisocyanates include, for example, polymethylene poly(phenylisocyanate) blends having an average functionality of from about 2.5 to about 3.0, preferably about 2.6 to about 2.8, an NCO group content of about 30 to 32% by weight, and a monomer content of from about 40 to 50% by weight, wherein the content of monomer comprises no more than about 1% by weight of the 2,2'-isomer, from about 2 to about 10% by weight of the 2,4'-isomer and from about 35 to about 45% by weight of the 4,4'-isomer, based on the entire weight of the polyisocyanate. This isocyanate blend comprises from about 50 to about 60% by weight, based on the entire weight of the polyisocyanate, of polymeric MDI.

Suitable polyisocyanates for component 1)(a) of the present invention also include, for example, mixtures of polyisocyanate blends as described above with adducts of MDI including, for example, allophanates of MDI as described in, for example, U.S. Pat. Nos. 5,319,053, 5,319, 054 and 5,440,003, the disclosures of which are herein incorporated by reference, and carbodiimides of MDI as described in, for example, U.S. Pat. Nos. 2,853,473, 2,941, 966, 3,152,162, 4,088,665, 4,294,719 and 4,244,855, the disclosures of which are herein incorporated by reference.

Suitable semi-prepolymers of polymethylene poly (phenylisocyanate) to be used as component 1)(b) of the present invention include those semi-prepolymers having an NCO group content of 25 to 30% by weight. These semi-prepolymers have a urethane group concentration of about 0.5 to 6% and a viscosity of less than about 2,000 cps at 20° C. Typically, suitable semi-prepolymers can be prepared by reacting a polymethylene poly(phenylisocyanate) with a polyol, or by blending the polymethylene poly (phenylisocyanate) with a prepolymer of monomeric methylene bis(phenylisocyanate) as described in, for example, U.S. Pat. Nos. 5,462,766 and 5,714,562, the disclosures of which are herein incorporated by reference.

It is also possible to prepare suitable semi-prepolymers from a mixture of monomeric and polymeric MDI and an isocyanate-reactive material having at least one hydroxyl group and a molecular weight of from about 62 to about 6,000. These isocyanate-terminated prepolymers are formed by reacting a polyisocyanate mixture and an isocyanate-reactive compound having from about 1 to about 8 hydroxyl groups and a molecular weight of from about 62 to about 6,000 in amounts such that the ratio of equivalents of hydroxyl groups to isocyanate groups is from about 0.001:1 to about 0.20:1, preferably from about 0.004:1 to about 0.1:1. The polyisocyanate mixture must be a mixture of polymeric MDI and a mixture of MDI isomers.

The polyisocyanate mixture may be produced in accordance with any of the techniques known in the art. The isomer content of the diphenylmethane diisocyanate may be brought within the required ranges, if necessary, by techniques which are well known in the art. One technique for changing isomer content is to add monomeric MDI to a mixture of MDI containing an amount of polymeric MDI which is higher than desired.

Polymeric isocyanates prepared from residues of the toluene diisocyanate production process may optionally be included in the binder composition of the present invention. Such residues are described, for example, in U.S. Pat. No. 5,349,082, the disclosure of which is herein incorporated by reference.

The isocyanate-reactive compound which is used to produce the semi-prepolymers of the present invention must have at least one hydroxyl group, preferably from about 2 to about 8 hydroxyl groups, and most preferably from about 2 to about 4 hydroxyl groups and a molecular weight of from about 62 to about 8,000, preferably from about 100 to about 5,000, most preferably from about 100 to about 2,000. Any of the known isocyanate-reactive materials having at least 1 hydroxyl group satisfying these criteria may be used. Suitable isocyanate-reactive materials include but are not limited to any of the known polyesters and polyethers.

Polyesters which may be used to produce the prepolymers of the present invention include the reaction products of polyhydric (preferably dihydric) alcohols with polybasic (preferably dibasic) carboxylic acids, polycarboxylic acid anhydrides or polycarboxylic acid esters of lower alcohols. The polycarboxylic acid may be aliphatic, cycloaliphatic, aromatic and/or heterocyclic and may optionally be substituted (e.g., by halogen atoms) and/or unsaturated. Specific examples of suitable carboxylic acids and their derivatives are succinic acid, glutaric acid, adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid anhydride, dimerized and trimerized unsaturated fatty acids (optionally in admixture with monomeric unsaturated fatty acids such as oleic acid), terephthalic acid dimethyl ester and terephthalic acid-bis-glycol ester. Specific examples of suitable alcohols are 1,2-propylene glycol, 1,3-propylene glycol, 1,4-butylene glycol, 2,3-butylene glycol, 1,6-hexanediol, 1,8-octanediol, neopentyl glycol, 1,4-bis-hydroxymethyl cyclohexane, 2-methyl-1,3-propanediol, glycerol, trimethylol propane, 1,2,6-hexanetriol, 1,2,4-butanetriol, trimethylol ethane, pentaerythritol, quinitol, mannitol, 1,4-cyclohexanedimethylol, sorbitol, formitol, methyl glycoside, diethylene glycol, triethylene glycol, tetraethylene glycol, higher polyethylene glycols, dipropylene glycol, higher polypropylene glycols, dibutylene glycol and higher polybutylene glycols. The polyester may contain terminal carboxyl groups or a small portion of monofunctional ester capped functionalities. Polyesters of lactones (e.g., $\epsilon$-caprolactone) or of dihydroxy carboxylic acids (e.g., $\omega$-hydroxy caproic acid) may also be used.

Preferred polyesters are prepared from mixtures of phthalic, isophthalic and terephthalic acids with ethylene glycol, diethylene glycol and higher polyethylene glycols. The materials are often obtained in the recycling process for plastic bottles.

Polyethers which may be used to produce the prepolymers of the present invention may be produced, for example, by polymerizing epoxides themselves in the presence of a Lewis acid catalyst or by the addition of an epoxide to starter components containing reactive hydrogen atoms such as water, alcohols, ammonia or amines. Epoxides which may be used include ethylene oxide, propylene oxide, butylene oxide, tetrahydrofuran, styrene oxide and epichlorohydrin. Ethylene oxide, propylene oxide and combinations thereof are particularly preferred.

Specific examples of suitable starter components include: ethylene glycol, 1,3-propylene glycol, 1,2-propylene glycol, trimethylol propane, glycerol, sorbitol, 4,4'-dihydroxy diphenyl propane, aniline, ethanolamine, substituted ethanolamines such as methyl ethanolamine and methyl diethanolamine, ethylene diamine, and sucrose. The starter component may be used alone or in admixture with other starter components.

Preferred polyethers are polypropylene oxide adducts started on an amine such as ammonia, ethylene diamine, and substituted ethanolamines.

The polyisocyanate mixture and isocyanate-reactive material used to produce the semi-prepolymers of the present invention are each used in quantities such that the ratio of equivalents of hydroxyl groups to isocyanate groups is from about 0.001:1 to about 0.20:1, preferably from about 0.004 to about 0.1:1, most preferably from about 0.005 to about 0.02.

The semi-prepolymers of the present invention may be prepared by reacting the polyisocyanate mixture and hydroxyl compound at temperatures of from about 10 to about 250° C., preferably from about 60 to about 120° C. for a period of from about 1 to about 1500 minutes, preferably from about 30 to about 200 minutes.

Other materials which may optionally be used in the production of the semi-prepolymers of the present invention include polycarbonates, ester carbonates and ether carbonates containing isocyanate-reactive hydrogen atoms.

The semi-prepolymers of the present invention are characterized by a viscosity of less than 2,000 cps at 20° C., preferably a viscosity of less than 1,000 cps at 20° C. These prepolymers also have an NCO (i.e., isocyanate group) content of from about 25 to about 33%.

In accordance with the present invention, it is preferred that the semi-prepolymers used as component 1)(b) have an NCO group content of about 27 to 31%, a urethane group content of about 1 to about 4%, and a viscosity of less than about 1,000 cps at 20° C.

Suitable thixotropic agents to be used as component 2) in the present invention are selected from the group consisting of (a) a mineral species, (b) a rheological additive, (c) an adduct containing terminal NCO groups and urea groups, and which comprises the reaction product of (1) a polyisocyanate or a semi-prepolymer thereof, with (2) a compound selected from the group consisting of (i) a substituted aromatic diamine, (ii) a fatty amine, and (iii) a polyamine based on a fatty acid, and (d) mixtures thereof.

Suitable mineral species to be used as component 2)(a) in the present invention include, for example, organophilic clays such as, for example, kaolin, bentonite, calcium sulfonates, and surface modified organophilic clays, etc., silica such as silica gel, fumed silica, precipitated silica, and surface treated silicas, colloidal particles such as calcium and barium carbonates and acetates, xonotlite fibers such as, for example, micronized synthetic calcium silicate crystals, etc.

Suitable rheological additives to be used as thixotropic agents, component 2)(b), in the present invention include, for example, polyesters, polyamines, and/or polyester amines prepared from fatty acids such as, for example, dimer acids or hydrogenated dimer acids, esters derived from fatty acids such as, for example, castor oil, fatty acid amide amines, known to those skilled in the art. Some examples of suitable rheological additives for the thixotropic agent of the present invention include, but are not limited to, compounds such as hydrogenated castor oil-polyamide oligomers, polyesters prepared from castor oil and fatty acids, polyamides prepared from diamines and polymeric fatty acids, polyoxyalkylene-polyamides based on amine-terminated polyesters and tall oil fatty acid and/or fatty acid dimer, polyester amides prepared from polymeric fatty acids, polyester amides prepared from ethoxylated amines, for example, ethoxylated cocamine, polyester amides prepared from ester-amides and ricinoleic acid.

It is also within the scope of the present invention to use certain adducts, component 2)(c), as thixotropic agents. These adducts (c) contain terminal NCO groups and urea groups. Suitable adducts comprise the reaction product of (1) a polymethylene poly(phenylisocyanate) or a semi-prepolymer thereof, having an NCO group content of about 25 to 33% by weight, with (2) a compound selected from the group consisting of (i) an aromatic diamine having at least one alkyl substituent in the ortho position to each amino group, (ii) a fatty amine and (iii) a polyamine based on a fatty acid. It is preferred that these are adducts of a polyisocyanate or semi-prepolymer thereof with a polyamine based on a fatty acid. The quantities of components are such that the NCO:NH$_2$ equivalent ratio, of 2)(c)(1) to 2)(c)(2), is from about 50:1 to 200:1.

Suitable polyisocyanates and semi-prepolymers thereof for the preparation of suitable adducts to be used as component 2)(c) in the present invention include polymethylene poly(phenylisocyanates) having an NCO group content of 30 to 33% and semi-prepolymers of polymethylene poly (phenylisocyanates), the semi-prepolymers having an NCO group content of 25 to 33%.

For the preparation of the isocyanate semi-prepolymers, the starting polyisocyanates and polyhydroxyl compounds exemplified above are reacted together in such quantities that the resulting semi-prepolymers have an isocyanate content of about 25 to 33% by weight, preferably about 27 to 31 % by weight. This reaction is carried out in known manner, generally within a temperature range of about 0° C. to 250° C. Reaction products containing free isocyanate groups and urethane groups are obtained. These products are accompanied by unreacted starting polyisocyanates depending on the amount of excess polyisocyanate used into the reaction.

Suitable substituted aromatic diamines to be used as component 2)(c)(2)(i) in preparing the adducts as the thixotropic agent in the process according to the invention include any aromatic diamines having at least one alkyl substituent in the ortho position to each amino group, in particular, diamines having at least one alkyl substituent in the ortho position to the first amino group and 2 alkyl substituents each with 1 to 4, preferably 1 to 3 carbon atoms in the ortho position to the second amino group. Those which have an ethyl, n-propyl, and/or isopropyl substituent in at least one ortho position to each amino group and optionally methyl substituents in other ortho positions to the amino groups are particularly preferred. The following are examples of such diamines: 2,4-diaminomesitylene, 1,3,5triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, mixtures of the last two mentioned diamines, 4,6-dimethyl-2-ethyl-1,3-diaminobenzene, 3,5,3',5'-tetraethyl4,4'-diaminodiphenylmethane, 3,5,3',5'-tetraisopropyl-4,4'-diaminodiphenylmethane, 3,5-diethyl-3', 5'-diisopropyl-4,4'-diaminodiphenylmethane, 1-t-butyl-3,5-dimethyl-2,4-diaminobenzenes, 1-t-butyl-3,5-dimethyl-2,6-diaminoben-zenes and mixtures thereof with 1-methyl-3,5-diethyl-2,6-diaminobenzene which generally contain up to about 35% by weight, based on the total mixture of the 2,6-isomer are particularly preferred as starting component 2)(c)(2)(i) according to the invention.

Suitable fatty amines to be used as component 2)(c)(2)(ii) in the present invention for preparing adducts 2)(c)(2) include but are not limited to, for example, aliphatic or cycloaliphatic amines containing from 12 to 30 carbon atoms, preferably from 18 to 24 carbon atoms, or mixtures thereof. Examples of such fatty amines include docosylamine, eicosylamine and N,N-bis(2-ethylhexyl) amine. Also included are the products obtained by saponification and subsequent amination of various natural oils including but not limited to, for example, coconut oil, palm oil and the like.

Suitable polyamines based on fatty acids to be used as component 2)(c)(2)(iii) in preparing the adducts for the present invention includes, for example, any amine functional polyamidoamines based on fatty acid and/or fatty amines with number average molecular weights of less than about 500. These include, but are not limited to those compounds which are reaction products prepared from $C_{12-18}$ fatty acid, dimerized $C_{36-54}$ fatty acid (mainly from oleic and linoleic acids), soybean oil, tall-oil, linseed-oil, castor-oil, and their dimers, with polyamines such as dipropylenetriamine and hexamethylenediamine, and especially ethylenediamine and its derivatives, diethylenetriamine, triethylene-tetraamine, and tetraethy-lenepentamine. Also included are dimer acid-based amine-terminated polyamides including reaction products incorporating portions of mono-, such as octanoic acid, stearic acid, or $C_{4-2}$ aliphatic dicarboxylic acids, such as, adipic acid, sebacic acid and azelaic acid. Also included are polyamidoamines containing at least a portion of polyoxyalkylene diamine, such as Jeffamine D-2000 optionally with other polyamines. In the process according to the invention, thixotropic binder compositions can be prepared not only by adding the thixotropic agent to the polyisocyanate, but also by generating the thixotropic adduct 2)(c) in situ in the polyisocyanate, i.e., component 1), as described above. These components are used in such proportions that the equivalent ratio of isocyanate groups in the polyisocyanates or semi-prepolymers of component 1) according to the invention, based on polyisocyanate mixtures of the diphenylmethane series, to amine groups in the substituted aromatic diamine, fatty amine or in the polyamine based on a fatty acid is about 50:1 to 200:1, preferably about 100:1 to 150:1.

The degree to which the binder composition is rendered thixotropic depends mainly on the proportion of reaction products containing urea groups as obtained by the reaction of component 1) with component 2). The quantity of individual starting materials required for producing the desired thixotropic effect can therefore be readily determined by a few preliminary tests.

The process of preparing these thixotropic agents described above for the present invention is preferably carried out at room temperature, with up to 20% by weight of a suitable inert, preferably apolar or only slightly polar lacquer solvents such as aromatic hydrocarbon processing oils, petroleum hydrocarbons, xylene, toluene or mixtures of such solvents. More preferably, solvents are present in an amount of from about 5% to about 20% by weight, based on the total weight of the thixotropic binder composition. It is preferred that solvents have high boiling points and low flammability and toxicity as described in, for example, U.S. Pat. No. 5,140,856, the disclosure of which is herein incorporated by reference. It is preferred that solvents have a flash point greater than 120° C. Thus, solvents and other extenders, for example, propylene carbonate, aromatic hydrocarbons, and linseed oil derivatives are preferred.

Known catalysts for accelerating the isocyanate addition reaction may in principle be used in forming these thixotropic agents. Suitable catalysts for this purpose include tin compounds such as dibutyl tin dilaurate or tin(II) octoate. Other catalysts are described in "Kunstoff Handbuch", Volume VII, published by Becker and Braun, Carl Hanser Verlag, Munich, 1983 on pages 92–98. The catalysts are used, if at all, in a quantity of about 0.001 to 10% by weight, preferably about 0.002 to 0.1% by weight, based on the total quantity of reactants.

Other optional additives and/or auxiliary agents which may be included in the thixotropic binding compositions of the present invention include, for example, wax emulsions or slack wax for reduced water absorption, preservatives, surface active additives, e.g., emulsifiers and stabilizers, mold release agents such as, for example, zinc stearate, and other soaps, etc.

In general, the isocyanate component 1) and the thixotropic agent 2) are mixed by normal batch mixing processes using low shear or high shear mixers known to those skilled in the art. In-line or continuous mixing devices including, for example, pin mixers, static mixers, etc. are also suitable for the presently claimed invention.

As used herein, the term molecular weight refers to the number average molecular weight, as determined by end-group analysis.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in Examples 1–8 of the present invention:

Isocyanate A
  a polymeric MDI blend having a viscosity of about 200 mPa·s, and an isocyanate content of about 31.5% (Mondur®541)

Thixotrope A
  a fumed silica, commercially available from DeGussa Corporation (Dublin, Ohio) under the name Aerosil® R202.

The wood pieces used were strands of aspen wood with similar grain patterns. These strands measured 12 in×12 in×1 mm. The wood binder comprised Isocyanate A and Thixotrope A.

Absorbance Study Methods

Viscosity: The viscosity of each sample was measured at varying temperatures, while maintining a constant spindle speed of 1 rpm. Viscosity was also measured at varying speeds while maintaining a constant 25° C. temperature. Table 1 shows data for Isocyanate A viscosity at 1 rpm versus temperature, Table 2 shows data for Isocyanate A visoicity at 25° C. versus spindle speed, and Table 3 shows data for 0.875% Thixotrope A/99.125% Isocyanate A mixture viscosity at 25° C. versus spindle speed.

TABLE 1

Temperature vs. Viscosity for Isocyanate A at 1 rpm

| Temperature (° C.) | Viscosity (mPa · s) |
| --- | --- |
| 19 | 410 |
| 25 | 250 |
| 48 | 50 |
| 74 | 25 |
| 98 | 13 |

TABLE 2

Spindle Speed vs. Viscosity for Isocyanate A at 25° C.

| Speed (rpm) | Viscosity (mPa · s) |
| --- | --- |
| 1 | 252 |
| 2 | 250 |
| 5 | 248 |
| 10 | 247 |
| 50 | 243 |
| 100 | 241 |

TABLE 3

Spindle Speed vs. Viscosity for 0.875% Thixotrope A/99.125% Isocyanate A mixture at 25° C.

| Speed (rpm) | Viscosity (mPa · s) |
| --- | --- |
| 1 | 368 |
| 2 | 358 |
| 5 | 346 |
| 10 | 336 |
| 50 | 315 |
| 100 | 307 |

Sample Preparation: The wood was first submerged in liquid nitrogen and razor cut into pieces measuring 5 cm×1 cm×1 mm. This was done to minimize pore closure during the cutting process, and was determined to be the best cutting method by examination with a scanning electron microscope (SEM). The wood was then heated in a drying oven to drive off inherent moisture, and stored in a plastic ziploc bag. Samples of Isocyanate A and Thixotrope A (in varying amounts: see Table, below) were prepared by introduction of the components under low shear (250–500 rpm) using an IKA Labs Eurostar Digivisc mechanical stirrer. The samples were padded under nitrogen and sealed with Paraflim after each exposure to atmosphere.

Wicking: The wood strips were vertically suspended from an analytical balance in a closed chamber on a Cahn Dynamic Contact Angle Analyzer (model DCA-312). The chamber was purged under nitrogen to minimize moisture in the samples. Nitrogen pressure in the chamber was kept constant at 1 atmosphere, and variation in temperature was monitored, with the variation ranging from 19 to 28° C. The wood was submerged 4 mm into the various isocyanate/thixotrope samples, and the weight (in mg) of the uptaken material was recorded approximately every second. The sample was allowed to sit undisturbed for twenty minutes. After each wicking trial was completed, the height of sample uptake on the wood was measured with a millimeter ruler. Each sample was wicked four times with the exception of Isocyanate A (the control), which was wicked twelve times, and the 99% Isocyanate A/1 % Thixotrope A sample, which was wicked eight times. Values reported in Table 4 are the average values in each case.

TABLE 4

Absorbance vs. Amount of Thixotrope

| Example # (% Aerosil in sample) | Viscosity in mPa · s (25° C., 1 rpm) | Density at 25° C. (g/ml) | Average Rate of Absorbance after 20 min (ml/sec/mm$^2$)$^B$ | Average Height of Sample (mm) |
| --- | --- | --- | --- | --- |
| 1 (0.00$^A$) | 252 | 1.235 | 6.40 × 10$^{-7}$ | 25.00 |
| 2 (0.250) | 271 | 1.235 | 4.75 × 10$^{-7}$ | 4.75 |
| 3 (0.500) | 288 | 1.226 | 4.80 × 10$^{-7}$ | 3.75 |
| 4 (0.750) | 317 | 1.235 | 3.65 × 10$^{-7}$ | 2.25 |
| 5 (0.875) | 368 | 1.238 | 3.50 × 10$^{-7}$ | 3.50 |
| 6 (1.000) | 432 | 1.230 | 3.60 × 10$^{-7}$ | 4.63 |
| 7 (1.500) | 543 | 1.237 | 4.57 × 10$^{-7}$ | 3.50 |
| 8 (3.000) | 740 | 1.225 | 4.20 × 10$^{-7}$ | 3.50 |

Notes:
$^A$Isocyanate A neat as control.
$^B$Calculated using Poiseuille's Law (Peoples, S. A., Proc.West.Pharmacol.Soc.15:161–165 (1972)).

From data listed in Table 4, it was determined that compared to Isocyanate A alone, samples containing Thixotrope A slow the rate of uptake of the thixotropic binder by the wood.

EXAMPLES 9–15

Wood Composite Board Studies

The following additional components were used in Examples 9–15 of this application:

Solvent A
  an aromatic petroleum distillate sold under the name Viplex® 885; commercially available from Crowley Chemical Corporation, Inc. (New York, N.Y.).

Amine A
  a fatty acid amidoamine commercially available under the name Versamid® 140 from Henkel Corporation (Kankakee, Ill.).

Thixotrope B
  an organically modified hectorite clay commercially available under the name Bentone® Gel CAO from Rheox, Inc. (Hightstown, N.J.).

Thixotrope C
  a calcium sulfonate compound commercially available under the name Ircogel® 903 from Lubrizol Corporation (Wickliffe, Ohio).

Particle Board Furnish
  mixed hardwood wood particles containing 6–7% moisture obtained as "surface fine furnish" obtained from Allegheny Particleboard (Pittsburgh, Pa.).

OSB Furnish
  strands of aspen wood measuring about 6 in×6 in×1 mm with similar grain patterns.

As listed in Table 5, the examples are described as follows:

Example 9 (Control)

Isocyanate A, Added to Particleboard Furnish at 5% w/w

Example 10

Isocyanate A, 99.125% by Weight, and Thixotrope A, 0.875% by Weight, Mixture Added at 5% w/w to Particleboard Furnish Example 11 (Control)

Isocyanate A, 80% by Weight, and Solvent A, 20% by Weight, Mixture Added to Particleboard Furnish at 5% w/w Example 12

Isocyanate A/Amine A, 79.2%/0.8% by Weight (Respectively) and Solvent A, 20% by Weight Mixture Added to Particleboard Furnish at 5% w/w Example 13

Isocyanate A, 97% by Weight, and Thixotrope B, 3% by Weight, Mixture Added to OSB Furnish at 5% w/w Example 14

Isocyanate A, 97% by Weight, and Thixotrope C, 3% by Weight, Mixture Added to OSB Furnish at 5% w/w Example 15 (Control)

Isocyanate A, 5% w/w on OSB Furnish

The Composites Were Prepared by the Following Procedures: Procedure for Preparation of Thixotropic Binder (Isocyanate and Thixotrope Only)

Preparation of binder for the various systems of this invention followed the same method, only differing in the components used from Examples 1–8, as noted in Table 4. Isocyanate A was added to a 16 oz. glass container, which was placed under an IKA Labs Eurostar Digivisc variable speed mechanical stirrer. The stirrer was started, set at a speed of 1000 rpm, while the various thixotropes were slowly added. The thixotropic binder compositions were allowed to mix for ten minutes, after which the materials were visually determined to be homogeneous.

Procedure for Preparation of Diluted Binder (Isocyanate and Solvent)

Isocyanate A was placed into a 16 oz. glass container, and an IKA Labs Eurostar Digivisc variable speed mechanical stirrer was placed into the isocyanate. Solvent A was added while the stirrer was stirring (at 1000 rpm), and the mixture was allowed to stir for 10 minutes. The mixed binder was visually determined to be homogeneous.

Procedure for Preparation of Diluted Thixotropic Binder (Isocyanate/Amine Thixotropic Binder With Added Solvent)

Binder including Isocyanate A, Solvent A, and Amine A was prepared by placing the isocyanate into a 16 oz. glass container, into which was placed an IKA Labs Eurostar Digivisc variable speed mechanical stirrer. The stirrer was started, set at a speed of 1000 rpm, and Solvent A was slowly added. The sample was allowed to mix for ten minutes, after which the material was visually determined to be homogeneous. The sample was allowed to sit for 30 minutes, to allow for release of any air trapped in the mixing of isocyanate and solvent. The sample was again placed under the IKA Labs stirrer, and the speed set to 2000 rpm. Addition of Amine A was then performed, over a five-minute period to form the thixotropic binder in situ. Sample was stirred for an additional ten minutes, after which it was visually determined to be homogeneous.

The following procedure was used for preparation of composite board panels using the various binder systems described above:

Procedure for Preparation of Particleboard Panels

Particleboard furnish was placed in a stainless steel bowl (for use in a KitchenAid KSM90 mixer). The stainless bowl was transferred to the KitchenAid mixer and the binder mixture was added in a continuous dropwise addition, over a period of five minutes, with the mixer running at its lowest speed setting. The furnish was mixed for an additional 10 minutes. The resin-coated furnish was then placed in an eight inch by eight inch form. The form was then placed in a PHI Hydraulic Press (PW-22 Series), and pressed at 350° F. for four and one half minutes.

Procedure for Preparation of Oriented Strandboard (OSB) Panels

Oriented strandboard furnish is sifted through a screen to remove undersized and irregular strands and then weighed into two 30-gallon plastic containers, and placed in a Coil Manufacturing Systems Rotary blender. Isocyanate binder is weighed into a holding container in the blender, as is Casco-wax (aqueous dispersion of slack wax available from Borden Chemical, Inc.). Isocyanate is added as per the examples below, and wax in all cases is added at 0.5% w/w, based on the total weight of the composite, to the OSB furnish. After starting rotation of the blender, the isocyanate and wax are evenly distributed on the furnish for a period of ten to fifteen minutes using a rotating bell spraying device. The resin and wax-coated strands are then replaced into the 30-gallon containers, for transfer to a form. The strands are then evenly distributed by hand into a form in a preset weight amount to obtain the desired 40 pcf density. The form is then removed from the distributed strands, which now form a mat. During this time, the press, a Newman Hydra-Press Model HP-188, is heated to working temperature, and a burst of steam is sent through the heated platens of the press to remove any built-up water in the lines. The mat is placed between two metal platens, and transferred to the press. Probes are then inserted into the pre-pressed mat to measure internal temperature and internal pressure. The board is then pressed under 100 psi steam pressure with 600 psi pressure on the mat for 2.5 minutes, resulting in the finished 1.5 inch thick board.

Resultant boards were tested for Internal Bond Strength and Thickness Swell in accordance with ASTM method D1037 "Evaluating Properties of Wood-Base Fiber and Particle Panel Materials".

TABLE 5

Composite Board Properties.

| Example # (description) | Viscosity (mPa · s) at 25° C., 1 rpm | Board Density (pcf) | Internal Bond Strength (psi) | Thickness Swell (%) |
| --- | --- | --- | --- | --- |
| 9 (5% Isocyanate A: control) | 252 | 40 | 240 | 10.5 |
| 10 (Isocyanate A/0.875% Thixotrope A) | 373 | 41 | 259 | 12 |
| 11 (Isocyanate A/ 20% Solvent A: control) | 203 | 42 | 228 | 13.6 |
| 12 (Isocyanate A/2% Amine A and 20% Solvent A) | 975 | 42 | 257 | 9.7 |
| 13 (Isocyanate A/3% Thixotrope B) | 590 | 40 | 124 | 6.7 |
| 14 (Isocyanate A/3% Thixotrope C) | 393 | 40 | 120 | 7.2 |
| 15 (5% Isocyanate A: control) | 252 | 40 | 128 | 5.3 |

From data listed in Table 5, it was determined that compared to samples containing Isocyanate A alone, samples containing thixotropic binder have properties equal to or better than the control. In cases where the resin is diluted with solvent (Ex. 11), the addition of the thixotrope (Ex. 12) actually improves the properties of the composites formed therefrom, even to a point wherein the properties are better than those not containing thixotrope and a higher level of polyisocyanate (Ex. 9).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of wood composite materials comprising:

A) combining wood particles with 1 to 25% by weight, based on the total weight of the wood composite, of a thixotropic binder composition comprising:
  1) an isocyanate component selected from the group consisting of:
    (a) a polymethylene poly(phenylisocyanate) having an NCO group content of about 30 to 33%, and
    (b) a semi-prepolymer of polymethylene poly(phenylisocyanate) having an NCO group content of about 25 to 33%; and
  2) a thixotropic agent selected from the group consisting of:
    (a) a mineral species,
    (b) a rheological additive,
    (c) an adduct of
      (1) a polyisocyanate or a semi-prepolymer of a polyisocyanate, with
      (2) a compound selected from the group consisting of (i) a substituted aromatic diamine, (ii) a fatty amine, and (iii) a polyamine based on a fatty acid, and
    (d) mixtures thereof;
  wherein the weight ratio of component A)2) to component A)1) is from 0.001:1 to 0.1:1; and
B) molding or compressing the combination formed in A).

2. The process of claim 1, wherein the wood particles are combined with from 2 to 10% by weight, based on the total weight of the wood composite, of a thixotropic binder composition.

3. The process of claim 2, wherein the weight ratio of A)2) to A)1) is 0.002:1 to 0.05:1.

4. The process of claim 2, wherein the weight ratio of A)2) to A)1) is 0.005:1 to 0.02:1.

5. The process of claim 1, wherein the wood particles are combined with from 3 to 8% by weight, based on the total weight of the wood composite, of a thixotropic binder composition.

6. The process of claim 1, wherein said thixotropic binder composition additionally comprises:
  3) up to 20% by weight, based on the total weight of the thixotropic binder composition, of at least one high boiling solvent.

7. The process of claim 1, wherein said thixotropic binder composition has a viscosity of less than 1,000 cps at high shear.

8. The process of claim 1, wherein said isocyanate component A)1) has a viscosity of less than about 2,000 cps at 20°.

9. The process of claim 1, wherein A)1)(a) said polymethylene poly(phenylisocyanate) has a functionality of from about 2.1 to about 3.5, and a monomer content of from about 30% to about 90% by weight and which comprises up to about 5% by weight of the 2,2'-isomer, from about 1 to about 20% by weight of the 2,4'-isomer, and from about 25 to about 65% by weight of the 4,4'-isomer, based on the entire weight of the polyisocyanate.

10. The process of claim 1, wherein said polymethylene poly(phenylisocyanate) has an average functionality of from about 2.5 to about 3.0, an NCO group content of about 30 to 32%, and a monomer content of from about 40 to 50% by weight and which comprises no more than about 1% by weight of the 2,2'-isomer, from about 2 to about 10% by weight of the 2,4'-isomer and from about 35 to 45% by weight of the 4,4'-isomer, based on the entire weight of the polyisocyanate.

11. The process of claim 6, wherein 3) said solvent has a flash point of greater than 120° C.

12. The process of claim 6, wherein 3) said solvent is selected from the group consisting of aromatic processing oils, propylene carbonate, aromatic hydrocarbons and linseed oil derivatives.

13. The process of claim 1, wherein A)1)(b) said semi-prepolymer has a urethane group content of 0.5 to 6%.

14. The process of claim 13, wherein A)1)(b) said semi-prepolymer comprises the reaction product of a polymethylene poly(phenylisocyanate) with a polyol.

15. The process of claim 14, wherein said polyol comprises an isocyanate-reactive material having at least one hydroxyl group and a molecular weight of from about 62 to about 6,000.

16. The process of claim 15, wherein the ratio of equivalents of hydroxyl groups to isocyanate groups is from about 0.001:1 to about 0.20 to 1.

17. The process of claim 1, wherein components 2)(c)(1) and 2)(c)(2) are present in amounts such that the NCO:$NH_2$ equivalent ratio is from about 50:1 to 200:1.

18. The process of claim 1, wherein 2)(c)(2)(i) said substituted aromatic diamines comprise aromatic diamines having at least one alkyl substituent in the ortho position to each amino group.

19. The process of claim 1, wherein 2)(c)(2)(ii) said fatty amines comprise aliphatic or cycloaliphatic amines containing from 12 to 30 carbon atoms.

20. The process of claim 1, wherein 2)(c)(2)(iii) said polyamines based on fatty acids include amine functional polyamidoamines based on fatty acids and/or fatty amines and having number average molecular weights of less than about 500.

21. The process of claim 1, wherein said thixotropic agent 2)(c) is generated in situ in 1) said isocyanate component.

* * * * *